Figure 1:
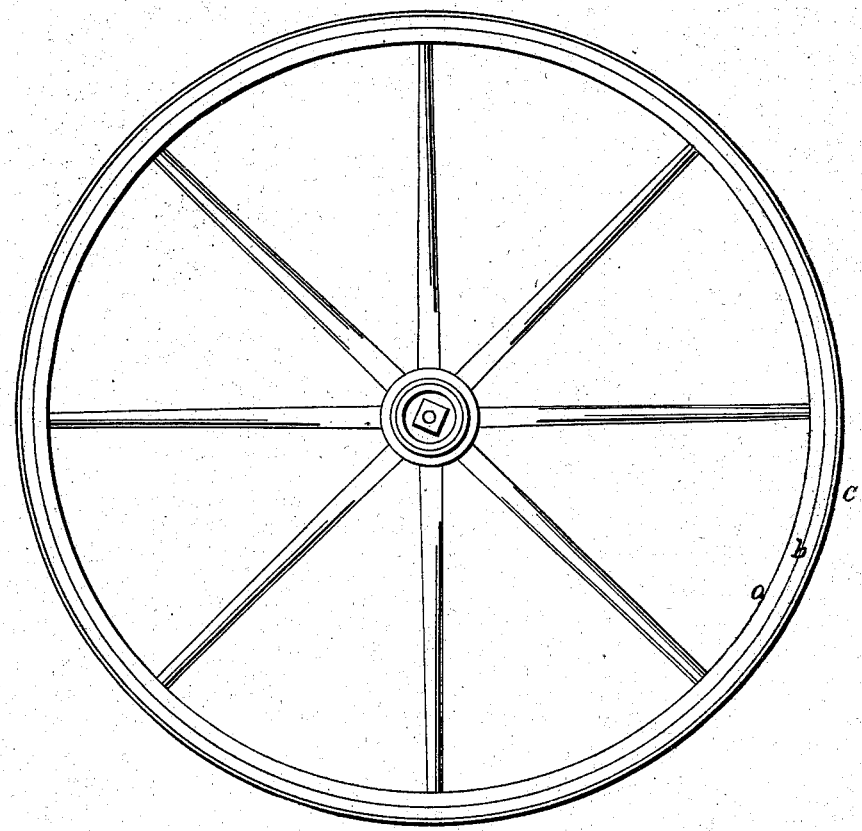
Figure 2:
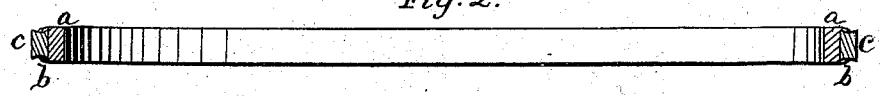

G. SOUTHER.
TIRE FOR CARRIAGE WHEELS.

No. 11,446. Patented Aug. 1, 1854.

UNITED STATES PATENT OFFICE.

GEORGE SOUTHER, OF SOUTH BOSTON, MASSACHUSETTS.

IMPROVED TIRE FOR CARRIAGE-WHEELS.

Specification forming part of Letters Patent No. 11,446, dated August 1, 1854.

*To all whom it may concern:*

Be it known that I, GEORGE SOUTHER, of South Boston, in the county of Suffolk and State of Massachusetts, have invented an Improvement in the Tires of Carriage-Wheels; and I do hereby declare that the following is a full, clear, and exact description of the principle or character which distinguishes it from all other things before known and of the usual manner of making, modifying, and using the same, reference being had to the accompanying drawings.

My invention consists in a mode of applying elastic tires to carriage-wheels, as hereinafter described. The tire $a$ of the wheel is made with two projecting flanges $b\,b$ all round, leaving a space between them for the elastic tire. An entire ring $c$ of elastic material—such as vulcanized rubber—is then stretched over the tire $a$ and sprung between the flanges $b\,b$. As the thickness of the elastic material is to be more than the height of the projecting flanges, the outer periphery of the ring will project over the outer periphery of the flanges, and thereby an elastic tire will be formed, which can be removed and renewed at pleasure. It serves to keep the iron tire unimpaired, does not require renewing so often as the iron tire, and contributes greatly to the comfort and economy of carriages.

For a pleasure-buggy I make the tire of wrought-iron, one and one-fourth inch wide, the flange of the same five-sixteenths of an inch deep inside and nine-sixteenths of an inch outside. The space between the two flanges is about one inch, and the strip of elastic material is one inch wide and five-eighths of an inch thick.

I am aware that elastic tires for wheels are not new, and I therefore do not lay claim to elastic tires nor to "india-rubber" tires, except in the mode herein set forth.

What I claim, therefore, as my improvement in tires of carriage-wheels is—

1. The employment of tires of india-rubber or equivalent elastic material inserted between projecting flanges and projecting beyond said flanges, in the manner and for the purposes set forth.

2. Using for said elastic tires an entire ring to be stretched over and sprung between the flanges, in the manner and for the purposes set forth.

GEORGE SOUTHER.

Witnesses:
CALVIN TARBETT,
TOBRINE CAMPBELL.